United States Patent
He et al.

(10) Patent No.: US 11,579,644 B2
(45) Date of Patent: Feb. 14, 2023

(54) METHOD AND SYSTEM FOR ONLINE CORRECTION OF JUNCTION TEMPERATURES OF IGBT IN PHOTOVOLTAIC INVERTER CONSIDERING AGING PROCESS

(71) Applicant: WUHAN UNIVERSITY, Hubei (CN)

(72) Inventors: Yigang He, Hubei (CN); Chuankun Wang, Hubei (CN); Weiwei Zhang, Hubei (CN); Lie Li, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 17/503,377

(22) Filed: Oct. 18, 2021

(65) Prior Publication Data
US 2022/0236756 A1 Jul. 28, 2022

(30) Foreign Application Priority Data
Jan. 22, 2021 (CN) .......................... 202110087068.8

(51) Int. Cl.
*G01R 31/26* (2020.01)
*G05F 1/56* (2006.01)
(Continued)

(52) U.S. Cl.
CPC ........... *G05F 1/567* (2013.01); *G01R 31/003* (2013.01); *G01R 31/26* (2013.01); *H02M 1/327* (2021.05);
(Continued)

(58) Field of Classification Search
CPC .. G01R 31/003; G01R 31/2608; G01R 31/26; G01R 31/2619; G01R 31/2637;
(Continued)

(56) References Cited

U.S. PATENT DOCUMENTS

2015/0226787 A1* 8/2015 Mankel ................ G01K 7/01
702/64
2018/0017613 A1* 1/2018 Qiao .................. G01R 31/2619
(Continued)

FOREIGN PATENT DOCUMENTS

CN 105911446 A * 8/2016 ......... G01R 31/2601
CN 106124957 A * 11/2016 ............. G01R 31/26
(Continued)

*Primary Examiner* — Thienvu V Tran
*Assistant Examiner* — Shahzeb K Ahmad
(74) *Attorney, Agent, or Firm* — JCIPRNET

(57) ABSTRACT

The invention discloses a method and a system for correction of the junction temperatures of an IGBT module in a photovoltaic inverter. The method includes: constructing an electrothermal coupling model of an IGBT model based on a photovoltaic inverter topology, a light radiation intensity, and an ambient temperature; selecting an IGBT collector-emitter on-state voltage drop as an aging parameter and designing an on-state voltage drop sampling circuit to ensure measurement accuracy; constructing an aging database for IGBT modules in different aging stages based on large current and small current injection methods; comparing a junction temperature value output by the electrothermal coupling model with the calibrated junction temperature value and calibrating an aging process coefficient of an electrothermal coupling model correction formula; comparing an IGBT aging monitoring value with the aging threshold to determine the aging process and selecting a corresponding aging process coefficient to ensure accuracy of junction temperature data.

18 Claims, 5 Drawing Sheets

(51) Int. Cl.
  *G05F 1/567*    (2006.01)
  *H02S 40/32*    (2014.01)
  *H02M 7/5387*   (2007.01)
  *H02M 1/32*     (2007.01)
  *G01R 31/00*    (2006.01)
  *G06F 119/08*   (2020.01)

(52) U.S. Cl.
  CPC ........... *H02M 7/5387* (2013.01); *H02S 40/32* (2014.12); *G06F 2119/08* (2020.01); *Y02E 10/56* (2013.01)

(58) Field of Classification Search
  CPC ............ G01R 31/2642; G01R 31/2601; G01R 19/00; G05F 1/567; H02M 1/327; H02M 7/5387; H02S 40/32; G06F 2119/08; G06F 30/36; Y02E 10/56
  See application file for complete search history.

(56) References Cited

U.S. PATENT DOCUMENTS

| | | | | |
|---|---|---|---|---|
| 2019/0250205 A1* | 8/2019 | Sarwar | ................ | G08B 21/182 |
| 2020/0266886 A1* | 8/2020 | Corzine | ............ | G01R 31/2656 |
| 2022/0034958 A1* | 2/2022 | Denk | ................ | G01R 31/2851 |

FOREIGN PATENT DOCUMENTS

| | | | | | |
|---|---|---|---|---|---|
| CN | 106168647 A | * | 11/2016 | ............ | G01R 19/00 |
| CN | 111007379 A | * | 4/2020 | ......... | G01R 31/2601 |

* cited by examiner

METHOD AND SYSTEM FOR ONLINE CORRECTION OF JUNCTION TEMPERATURES OF IGBT IN PHOTOVOLTAIC INVERTER CONSIDERING AGING PROCESS

CROSS-REFERENCE TO RELATED APPLICATION

This application claims the priority benefit of China application serial no. 202110087068.8, filed on Jan. 22, 2021. The entirety of the above-mentioned patent application is hereby incorporated by reference herein and made a part of this specification.

BACKGROUND

Technology Field

The disclosure relates to the field of reliability of core devices of power electronic equipment, and more specifically, relates to a method and a system for online correction of the junction temperatures of an insulated gate bipolar transistor (IGBT) module in a photovoltaic inverter considering the aging process.

Description of Related Art

The photovoltaic power generation industry is one of the fastest-growing emerging industries. As a connection device between distributed power sources and the distribution network, photovoltaic inverters play a key role in power conversion and transmission. At present, the most commonly used photovoltaic inverter is a three-phase voltage type bridge inverter, which is called three-phase two-level inverter because there are two levels of the output phase voltage. Insulated gate bipolar transistors (IGBTs) are widely used in photovoltaic inverters due to the advantages such as fast switching speeds, ease of drive, good voltage resistance, and high voltage capability. A failure of a photovoltaic inverter largely results from a failure of an IGBT. Photovoltaic inverters are often located outdoors and subjected to effects such as light intensity waves, ambient temperature, and radiation fluctuations. The core device IGBT often bears a large amount of thermal stress cyclic load, and the performance may gradually degrade until it fails.

Studies have shown that junction temperature fluctuations are the main cause of the IGBT failure. Due to different thermal expansion coefficients, the thermal stress in an IGBT structure is not uniform, resulting in damages to the bonding wires, the solder layer, and the inside of the chip. There are three types of junction temperature data acquisition methods: instrument measurement method, thermal parameter method, electrothermal coupling method. When compared in different aspects such as measurement area, application cost, destructiveness, adaptability to working conditions, and the like, the electrothermal coupling model ranks top in general.

However, the electrothermal coupling model of an IGBT is usually constructed according to the factory technical manual of the IGBT. Due to fatigue damage during work, the IGBT is constantly aging, which makes the pre-constructed electrothermal coupling model no longer adapt to the current IGBT health status. Accordingly, the aging of the IGBT has a non-negligible impact on the reliability evaluation of the IGBT in a photovoltaic inverter.

SUMMARY

In view of the above defects or required improvement of the prior art, the disclosure proposes a method and a system for online correction of the junction temperatures of an insulated gate bipolar transistor (IGBT) module in a photovoltaic inverter considering the aging process. The introduction of IGBT aging monitoring into IGBT junction temperature correction can realize online correction of junction temperature data, ensure the authenticity of junction temperature data, and realize the influence of the aging process on the calculation of the IGBT junction temperature of the photovoltaic inverter, thereby improving the accuracy of reliability assessment.

To achieve the objective, according to one aspect of the disclosure, a method for online correction of junction temperatures of an insulated gate bipolar transistor (IGBT) in a photovoltaic inverter considering an aging process includes steps as follows.

(1) An electrothermal coupling model of an IGBT model is constructed based on a photovoltaic inverter topology, the IGBT model, a light radiation intensity, and an ambient temperature.

(2) An IGBT collector-emitter on-state voltage drop Vce_on is used as an aging parameter and a voltage sampling circuit is designed according to working characteristics of the IGBT to collect the IGBT collector-emitter on-state voltage drop.

(3) An aging database for IGBT modules is constructed in different aging stages based on large current and small current injection methods, and the aging database includes a test current, an aging threshold, and a calibrated junction temperature value.

(4) A junction temperature value output by the electrothermal coupling model is compared with the calibrated junction temperature value, and an aging process coefficient of an electrothermal coupling model correction formula is calibrated.

(5) An IGBT aging monitoring value is compared with the aging threshold to determine the aging process and a corresponding aging process coefficient is selected to ensure accuracy of junction temperature data.

In some alternative embodiments, step (2) includes steps as follows.

(2.1) An upper arm IGBT collector-emitter on-state voltage drop measurement circuit for any one of U, V, and W three-phase circuits is designed, and the measurement circuit includes a self-driving MOSFET, an external driving MOSFET, a current limiting circuit, and a ground terminal GND. A driving signal of the external driving MOSFET is a driving signal of a lower arm IGBT, and a turn-on threshold of the self-driving MOSFET is a negative value; when the upper arm IGBT is turned on, a current does not flow through a sampling branch, meanwhile a driving voltage of the self-driving MOSFET is 0 greater than the turn-on threshold, and then a voltage at a measurement port is voltage drop Vce_on during conduction of the IGBT collector-emitter when the upper arm IGBT is turned off, the current flows through the sampling branch, and a negative voltage drop generated across a current limiting resistor is less than the turn-on threshold of the self-driving MOSFET, so the self-driving MOSFET is turned off, meanwhile the driving signal of the external driving MOSFET in the lower arm IGBT is turned on, the voltage at the measurement port is set 0; through the working process, voltage drop Vce_on during conduction of the IGBT collector-emitter of the upper arm IGBT can be collected, and a high voltage across the collector-emitter can be shielded when the IGBT is turned off.

(2.2) The lower arm IGBT collector-emitter on-state voltage drop measurement circuit for any one of the U, V, and W three-phase circuits is designed, and the measurement circuit includes a self-driving MOSFET, an external driving MOSFET, a current limiting circuit, a negative voltage port V–, and a ground terminal GND. A driving signal of the external driving MOSFET is a driving signal of the upper arm IGBT, and a turn-on threshold of the self-driving MOSFET is a negative value; when the lower arm IGBT is turned on, a current does not flow through a sampling branch, meanwhile a driving voltage of the self-driving MOSFET is 0 greater than the turn-on threshold, and a voltage at a measurement port is voltage drop Vce_on during conduction of the IGBT collector-emitter; when the lower arm IGBT is turned off, the current flows through the sampling branch, and a negative voltage drop generated across a current limiting resistor is less than the turn-on threshold of the self-driving MOSFET, so the self-driving MOSFET is turned off, meanwhile the driving signal of the external driving MOSFET in the lower arm IGBT is turned on, and the voltage at the measurement port is set to a voltage value of the negative voltage port; through the working process, voltage drop Vce_on during conduction of the IGBT collector-emitter of the U-phase lower arm IGBT can be collected, and a high voltage across the collector-emitter can be shielded when the IGBT is turned off.

In some alternative embodiments, step (3) includes:

(3.1) A healthy IGBT module in the photovoltaic inverter is enabled to work at a small current Imin and a corresponding relationship between a collector-emitter on-state voltage drop Vce_min and a junction temperature Tj is measured. When working at the small current, the collector-emitter on-state voltage drop of the healthy IGBT module has a linear relationship with the junction temperature and is not affected by the aging process.

(3.2) Different aging stages of an IGBT module are simulated by shearing bond lines of the IGBT module.

(3.3) For IGBT modules in different aging stages, the IGBT modules are enabled to work at the large current Imax and a current collector-emitter on-state voltage drop Vce_max is measured as a threshold value of a current aging stage. In a same switching signal cycle, the small current Imin is injected to measure the collector-emitter on-state voltage drop Vce_min, and accordingly the junction temperature Tj is measured as a calibrated junction temperature value of the current aging stage.

In some alternative embodiments, step (4) includes:

(4.1) Test conditions of operating parameters of the electrothermal coupling model are kept consistent for each aging stage.

(4.2) A difference $\Delta T$ between an output junction temperature value of the electrothermal coupling model and the calibrated junction temperature value is calculated.

(4.3) An aging process coefficient $\beta$ in an equivalent thermal network parameter correction formula of the electrothermal coupling model is adjusted so that the difference $\Delta T$ is 0, and a current aging correction coefficient is recorded. In $C = C_0 (1 + l \cdot \beta^m)$, $C$ represents corrected equivalent thermal network parameters, $C_0$ is original equivalent thermal network parameters, $l$ is an aging characteristic value of the IGBT module, $\beta$ is the aging process coefficient, and $m$ is an accelerated aging factor.

According to another aspect of the disclosure, a system for online correction of junction temperatures of an insulated gate bipolar transistor (IGBT) in a photovoltaic inverter considering an aging process is provided and includes:

a model constructing module used to construct an electrothermal coupling model of an IGBT model based on a photovoltaic inverter topology, the IGBT model, a light radiation intensity, and an ambient temperature;

a sampling module used to use an IGBT collector-emitter on-state voltage drop Vce_on as an aging parameter and design a voltage sampling circuit according to working characteristics of the IGBT to collect the IGBT collector-emitter on-state voltage drop;

a test module used to construct an aging database for IGBT modules in different aging stages based on large current and small current injection methods, wherein the aging database comprises a test current, an aging threshold, and a calibrated junction temperature value;

a correction module used to compare a junction temperature value output by the electrothermal coupling model with the calibrated junction temperature value and calibrate an aging process coefficient of an electrothermal coupling model correction formula; and an aging process monitoring module used to compare an IGBT aging monitoring value with the aging threshold to determine the aging process and select a corresponding aging process coefficient to ensure accuracy of junction temperature data.

In some alternative embodiments, the sampling module includes:

an upper arm sampling module used for a design of an upper arm IGBT collector-emitter on-state voltage drop measurement circuit of any one of U, V, and W three-phase circuits, the measurement circuit comprises a self-driving MOSFET, an external driving MOSFET, a current limiting circuit, and a ground terminal GND, wherein a driving signal of the external driving MOSFET is a driving signal of an lower arm IGBT, and a turn-on threshold of the self-driving MOSFET is a negative value; when the upper arm IGBT is turned on, a current does not flow through a sampling branch, meanwhile a driving voltage of the self-driving MOSFET is 0 greater than the turn-on threshold, and a voltage at a measurement port is voltage drop Vce_on during conduction of the IGBT collector-emitter; when the upper arm IGBT is turned off, the current flows through the sampling branch, and a negative voltage drop generated across a current limiting resistor is less than the turn-on threshold of the self-driving MOSFET, so the self-driving MOSFET is turned off; the driving signal of the external driving MOSFET in the lower arm IGBT is turned on, the voltage at the measurement port is set to 0; through the working process, voltage drop Vce_on during conduction of the IGBT collector-emitter of the upper arm IGBT can be collected, and a high voltage across the collector-emitter can be shielded when the IGBT is turned off; and a lower arm sampling module used for a design of a lower arm IGBT collector-emitter on-state voltage drop measurement circuit of any one of the U, V, and W three-phase circuits: the measurement circuit comprises a self-driving MOSFET, an external driving MOSFET, a current limiting circuit, a negative voltage port V–, and a ground terminal GND, wherein a driving signal of the external driving MOSFET is a driving signal of the upper arm IGBT, and a turn-on threshold of the self-driving MOSFET is a negative value; when the lower arm IGBT is turned on, a current does not flow through a sampling branch, meanwhile a driving voltage of the self-driving MOSFET is 0 greater than the turn-on threshold, and a voltage at the measurement port is voltage drop Vce_on during conduction of the IGBT collector-emitter; when the lower arm IGBT is turned off, the current flows through the sampling branch, and a negative voltage drop generated across the current limiting resistor is less than the turn-on threshold of the self-driving MOSFET, so the self-driving MOSFET is turned off, meanwhile the driving signal of the external driving MOSFET in the lower arm IGBT is turned on, and the voltage of the measurement port is set to a voltage value of the negative voltage port; through the working process, voltage drop Vce_on during conduction of the IGBT collector-emitter of the U-phase lower arm IGBT can be collected, and a high voltage across the collector-emitter can be shielded when the IGBT is turned off.

In some alternative embodiments, the test module is used to enable a healthy IGBT module in the photovoltaic inverter to work at a small current Imin and measure a corresponding relationship between a collector-emitter on-state voltage drop Vce_min and a junction temperature Tj, wherein when working at a small current, a collector-emitter on-state voltage drop of the healthy IGBT module has a linear relationship with a junction temperature and is not affected by the aging process; simulate different aging stages of an IGBT module by shearing bond lines of the IGBT module; for the IGBT modules in different aging stages, enable the IGBT modules to work at a large current Imax, and measure a current collector-emitter on-state voltage drop Vce_max as a threshold value of a current aging stage, in a same switching signal cycle, inject the small current Imin to measure the collector-emitter on-state voltage drop Vce_min, and accordingly measure the junction temperature Tj as the calibrated junction temperature value in the current aging stage.

In some alternative embodiments, the correction module is used to keep test conditions of operating parameters of the electrothermal coupling model consistent for each aging stage, calculate a difference ΔT between an output junction temperature value of the electrothermal coupling model and the calibrated junction temperature value, adjust an aging process coefficient β in an equivalent thermal network parameter correction formula of the electrothermal coupling model so that the difference ΔT is 0, and record a current aging correction coefficient β. In $C=C_0(1+l \cdot \beta^m)$, C represents corrected equivalent thermal network parameters, $C_0$ is original equivalent thermal network parameters, l is an aging characteristic value of the IGBT module, β is the aging process coefficient, and m is an accelerated aging factor According to another aspect of the disclosure, a computer-readable storage medium having a computer program stored thereon is provided. The steps of the method in any one of the foregoing are implemented when a computer program is executed by a processor.

Generally speaking, compared with the prior art, the technical solutions conceived by the disclosure can achieve beneficial effects as follows.

The disclosure introduces the IGBT aging monitoring into the IGBT junction temperature correction, the online correction of the junction temperature data can be realized, the authenticity of the junction temperature data is ensured, the influence of the aging process on the calculation of the IGBT junction temperature of the photovoltaic inverter is realized, and thereby the accuracy of reliability assessment is improved; the IGBT collector-emitter on-state voltage drop is selected as the aging parameter, and the on-state voltage drop sampling circuit is designed to ensure the measurement accuracy; for IGBT modules in different aging stages, an aging database (the test current, the aging threshold, the calibrated junction temperature value) is constructed based on large current and small current injection methods; the junction temperature value output by the electrothermal coupling model is compared with the calibrated junction temperature value, and the aging process coefficient of the aging correction formula of the electrothermal coupling model is calibrated. The IGBT aging parameter monitoring value is compared with the aging threshold value to determine the aging process, which is used as the basis for updating the parameters of the electrothermal coupling model in real time, the accuracy of the junction temperature data in different aging states are ensured and has strong online monitoring capabilities.

DESCRIPTION OF THE EMBODIMENTS

In order to make the objectives, technical solutions, and advantages of the disclosure comprehensible, embodiments accompanied with drawings are described in detail below to further describes the disclosure. It should be understood that the specific embodiments described herein are merely used to explain the disclosure, but not intended to limit the disclosure. In addition, the technical features involved in the various embodiments of the disclosure described below can be combined with each other as long as they do not conflict with each other.

A 30 kW photovoltaic inverter system is illustrated as a specific embodiment in the subsequent paragraphs, and refer to Table 1 for the specific parameters. An online correction of junction temperatures of an insulated gate bipolar transistor (IGBT) module in a photovoltaic inverter considering the aging process is used to perform online correction of the junction temperature of the IGBT for an inverter, and the disclosure is further illustrated in detail with reference to the accompanying drawings.

TABLE 1

System Parameters of the Photovoltaic Inverter System

| category | parameter |
|---|---|
| rated power/kW | 30 |
| grid side voltage/V | 400 |

TABLE 1-continued

System Parameters of the Photovoltaic Inverter System

| category | parameter |
| --- | --- |
| grid side frequency/Hz | 50 |
| IGBT switching frequency/kHz | 20 |
| DC side voltage/V | 650 V |
| IGBT model | BSM75GB170DN2 |

Figure 1:
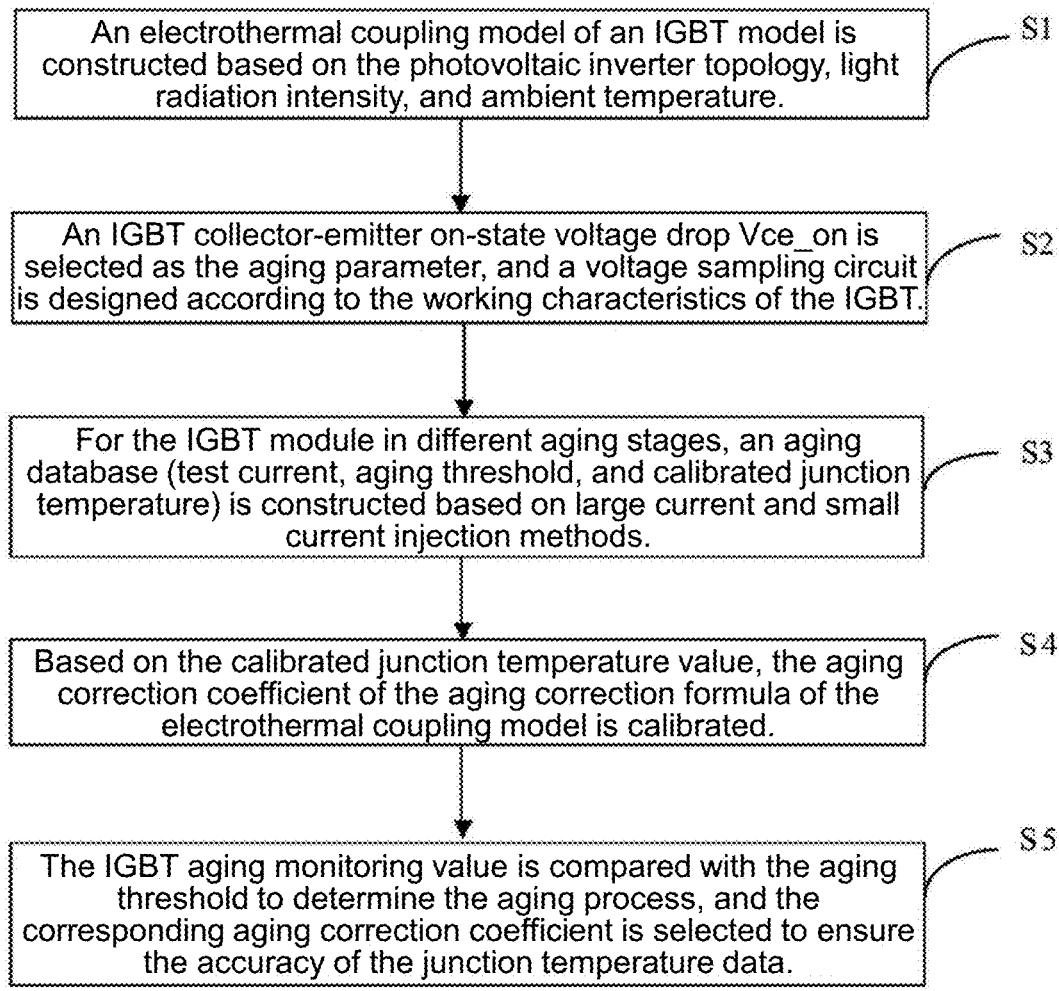
FIG. 1 is a flowchart illustrating a method for online correction of junction temperatures of an insulated gate bipolar transistor (IGBT) module in a photovoltaic inverter considering the aging process according to an embodiment of the disclosure.

Referring to FIG. 1, the embodiment of the disclosure includes steps as follows.

S1: An electrothermal coupling model of an IGBT is constructed based on the photovoltaic inverter topology, IGBT model, light radiation intensity, and ambient temperature.

Figure 2:
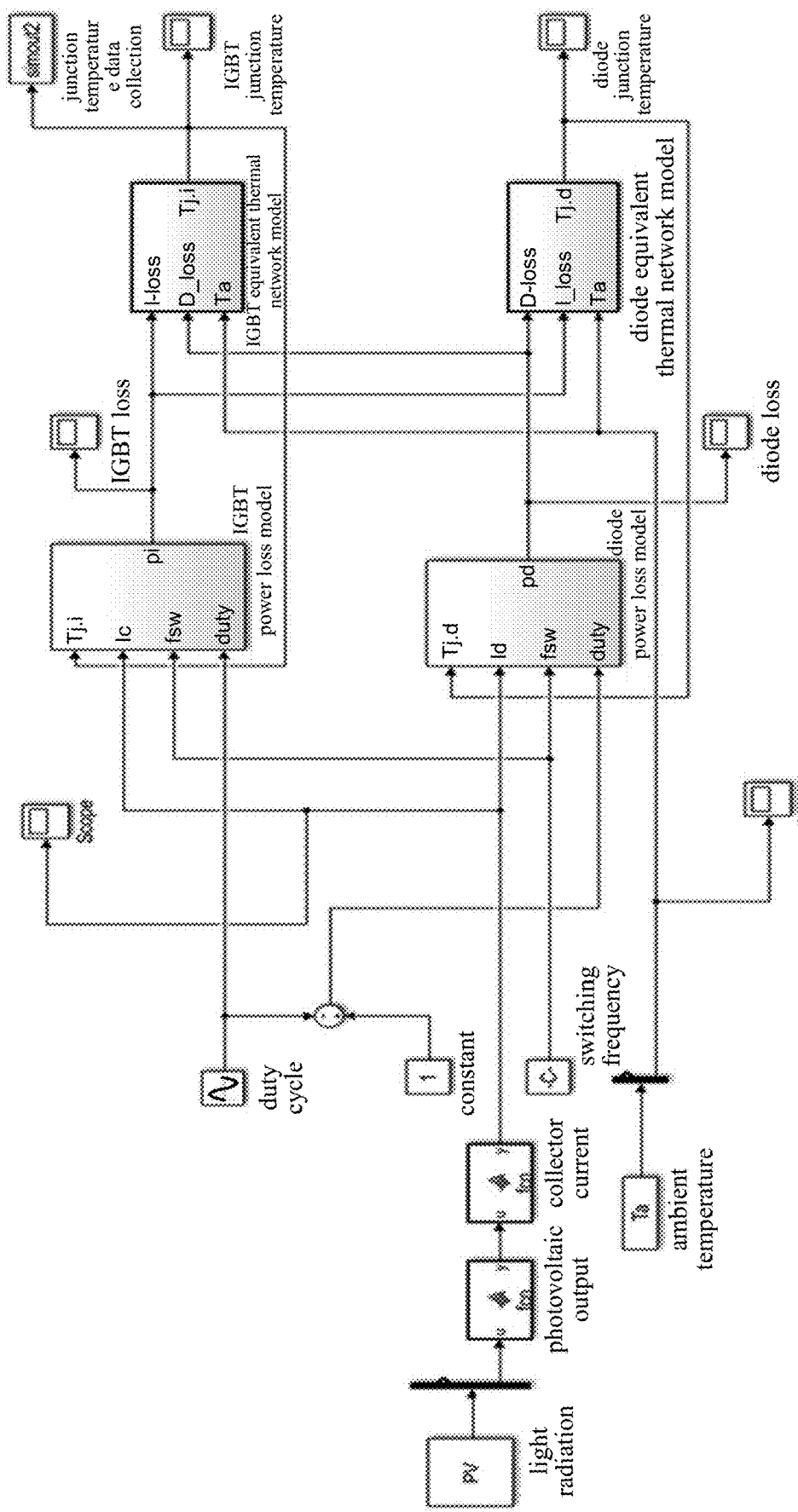
FIG. 2 is an electrothermal coupling simulation model of an IGBT module according to an embodiment of the disclosure.

Based on the data manual of the IGBT model BSM75GB170DN2, considering the influence of the photovoltaic inverter topology, the light radiation intensity and the environmental temperature, the electrothermal coupling simulation model is constructed in MATLAB/Simulink, as shown in FIG. 2. FIG. 2 is used to illustrate a schematic view of constructing the electrothermal coupling simulation model. The numerical references and device names in the drawing do not affect the understanding of the disclosure nor form a unique limitation to the embodiments of the disclosure. The relevant electrical parameters (duty cycle, collector current, switching frequency, and the like) of the photovoltaic inverter are input into an IGBT power loss model to calculate the real-time power loss. The power loss value output by the power loss model is input into an equivalent thermal network model of the IGBT module to simulate the junction temperature calculation, and finally the real-time junction temperature fluctuation data of the IGBT module under the current operating conditions can be output.

S2: An IGBT collector-emitter on-state voltage drop is selected as the aging parameter, and an on-state voltage drop sampling circuit is designed to ensure measurement accuracy.

When the IGBT is turned on, the collector-emitter voltage is several volts, and when the IGBT is turned off, the voltage between the collector and emitter can reach several hundred volts. In the working process of the high-speed switching IGBT, the voltage variation range between the collector and emitter is very large, leading to great difficulty in sampling a collector-emitter on-state voltage drop Vce_on online and accurately.

Figure 3:
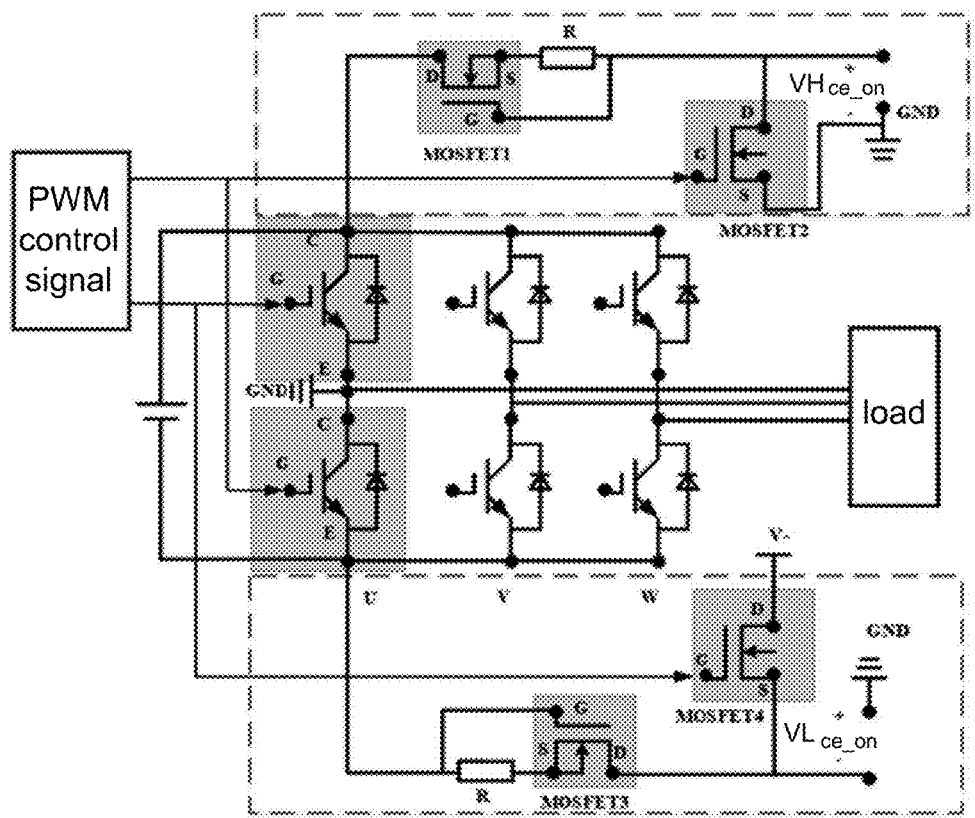
FIG. 3 illustrates a collector-emitter on-state voltage drop Vce_on sampling circuit according to an embodiment of the disclosure.

The voltage sampling circuit is designed according to the working characteristics of the IGBT. In the embodiment of the disclosure, the collector-emitter on-state voltage drop Vce_on sampling circuit is designed for the photovoltaic three-phase two-level inverter. Referring to FIG. 3, the U-phase circuit is illustrated as an example in the description as follows.

1) The design of a collector-emitter on-state voltage drop measurement circuit of an upper arm IGBT: the collector-emitter on-state voltage drop measurement circuit includes a self-driving MOSFET (MOSFET1), an external driving MOSFET (MOSFET2), a current limiting circuit, and a ground terminal GND. The driving signal of the external driving MOSFET is the driving signal of a lower arm IGBT, and the turn-on threshold of the self-driving MOSFET is a negative value. When the upper arm IGBT is turned on, the current does not flow through the sampling branch. Meanwhile, the driving voltage of MOSFET1 is 0 greater than its turn-on threshold, and the voltage at the measurement port is voltage drop Vce_on during conduction of the IGBT collector-emitter. When the upper arm IGBT is turned off, the current flows through the sampling branch, and the negative voltage drop generated across the current limiting resistor is less than the turn-on threshold of MOSFET1, so MOSFET1 is turned off. Meanwhile, the driving signal of MOSFET2 in the lower arm IGBT is turned on, the voltage of the measurement port is set to 0. Through the working process, voltage drop Vce_on during conduction of the IGBT collector-emitter of the U-phase upper arm IGBT can be successfully collected, and the high voltage across the collector-emitter can be shielded when the IGBT is turned off, effectively improving the sampling accuracy.

2) The design of a collector-emitter on-state voltage drop measurement circuit of the lower arm IGBT: the collector-emitter on-state voltage drop measurement circuit includes a self-driving (MOSFET3), an external driving MOSFET (MOSFET4), a current limiting circuit, a negative voltage port V−, and a ground terminal GND. The driving signal of the external driving MOSFET is the driving signal of the upper arm IGBT, and the turn-on threshold of the self-driving MOSFET is a negative value. When the lower arm IGBT is turned on, the current does not flow through the sampling branch. Meanwhile, the driving voltage of MOSFET3 is 0 greater than the turn-on threshold, and then the voltage at the measurement port is voltage drop Vce_on during conduction of the IGBT collector-emitter. When the lower arm IGBT is turned off, the current flows through the sampling branch, and the negative voltage drop generated across the current limiting resistor is less than the turn-on threshold of MOSFET3, so MOSFET3 is turned off. Meanwhile, the driving signal of MOSFET4 in the lower arm IGBT is turned on, and the voltage at the measurement port is set to the voltage value of the negative voltage port. Through the working process, voltage drop Vce_on during conduction of the IGBT collector-emitter of the U-phase lower arm IGBT can be successfully collected, and the high voltage across the collector-emitter can be shielded when the IGBT is turned off, effectively improving the sampling accuracy.

3) The design of the collector-emitter on-state voltage drop measurement circuits for the upper arm IGBT and lower arm IGBT of the V and W phase circuits is the same as the design process of 1) and 2), which is not iterated in the embodiment of the disclosure.

S3: For the IGBT module model BSM75GB170DN2 in different aging stages, an aging database (test current, aging threshold, and calibrated junction temperature value) is constructed based on large current and small current injection methods. In the embodiment of the disclosure, the parameters of the electrothermal coupling model can be corrected in ways as follows.

Figure 4:
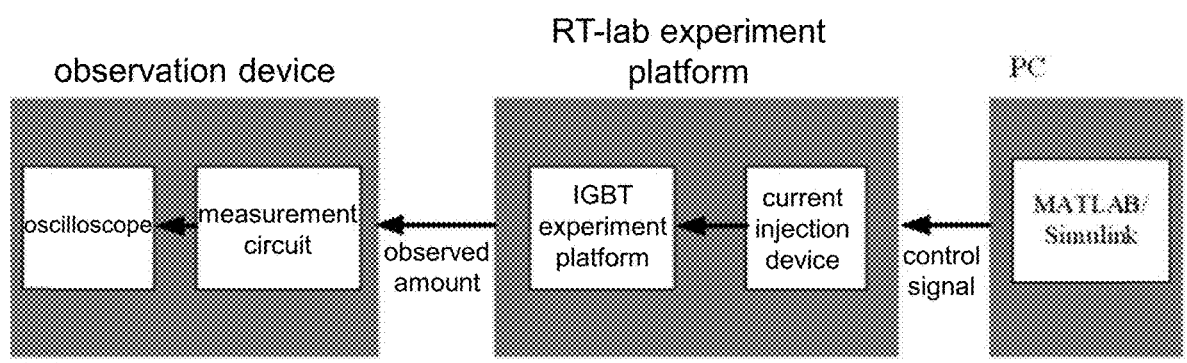
FIG. 4 illustrates an aging test platform for an IGBT module according to an embodiment of the disclosure.

1) Referring to FIG. 4, relying on the Matlab and RT-lab semi-physical simulation platform, first a healthy IGBT module model BSM75GB170DN2 is enabled to work at a small current Imin, and the corresponding relationship between the collector-emitter on-state voltage drop Vce_min and the junction temperature Tj is measured. Note that when working at the small current, the collector-emitter on-state voltage drop of the IGBT module has a linear relationship with the junction temperature and is not affected by the aging.

The small current Imin represents a current of about 100 mA, that is, the difference from 100 mA is within a preset range.

2) Next, different aging stages of an IGBT module are simulated by shearing bond lines of the IGBT module, as shown in Table 2.

TABLE 2

IGBT Aging Data

| aging stage | bonding wire aging state | aging process coefficient | aging threshold/V | calibrated junction temperature/° C. |
|---|---|---|---|---|
| I | completely healthy | $\beta_1 = 0$ | $V_{ce\_max1} = 3.050$ | $T_{j1} = 66.5$ |
| II | damage: 1 | $\beta_2 = 0.12$ | $V_{ce\_max2} = 3.120$ | $T_{j2} = 68.3$ |
| III | damage: 2 | $\beta_3 = 0.26$ | $V_{ce\_max3} = 3.193$ | $T_{j3} = 73.9$ |
| IV | damage: 3 | $\beta_4 = 0.33$ | $V_{ce\_max4} = 3.277$ | $T_{j4} = 77.6$ |
| V | damage: 4 | $\beta_5 = 0.41$ | $V_{ce\_max5} = 3.355$ | $T_{j5} = 82.4$ |

3) For IGBT modules in different aging stages, which work at a large current Imax (IGBT rated current) of 50 A, the collector-emitter on-state voltage drop, which is the threshold value of the current aging stage, is measured. Meanwhile, in the same switching signal cycle, a small current of 100 mA is injected, the collector-emitter on-state voltage drop is measured, and the current junction temperature Tj, which is the calibrated junction temperature value of the current aging stage, is obtained according to the corresponding relationship established before. For the specific parameter values of each aging stage, refer to Table 2.

S4: The junction temperature value output by the electrothermal coupling model is compared with the calibrated junction temperature value, and the aging process coefficient of the electrothermal coupling model correction formula is calibrated.

1) For the aging stage I, the operating parameters of the electrothermal coupling model is kept consistent with the test conditions in Matlab/Simulink.

2) The difference ΔT between the junction temperature output by the electrothermal coupling model and the calibrated junction temperature value is calculated.

3) The aging process coefficient in the equivalent thermal network parameter correction formula of the electrothermal coupling model is adjusted so that the difference ΔT is 0, and the current aging correction coefficient is recorded.

$$C = C_0(1 + l \cdot \beta^m)$$

C represents the corrected equivalent thermal network parameters, $C_0$ is the original equivalent thermal network parameters, l is the aging characteristic value of the IGBT module, β is the aging process coefficient, and m is the accelerated aging factor.

4) For aging stages II, III, IV, and V, step 1) to step 3) are repeated to obtain the correction coefficients in the different aging stages of the electrothermal coupling model correction formula. Refer to Table 2 for details.

S5: During the operation of the photovoltaic inverter, the IGBT aging monitoring value is compared with the aging threshold to determine the aging process, and the corresponding aging process coefficient is selected to ensure the accuracy of the junction temperature data.

Figure 5:
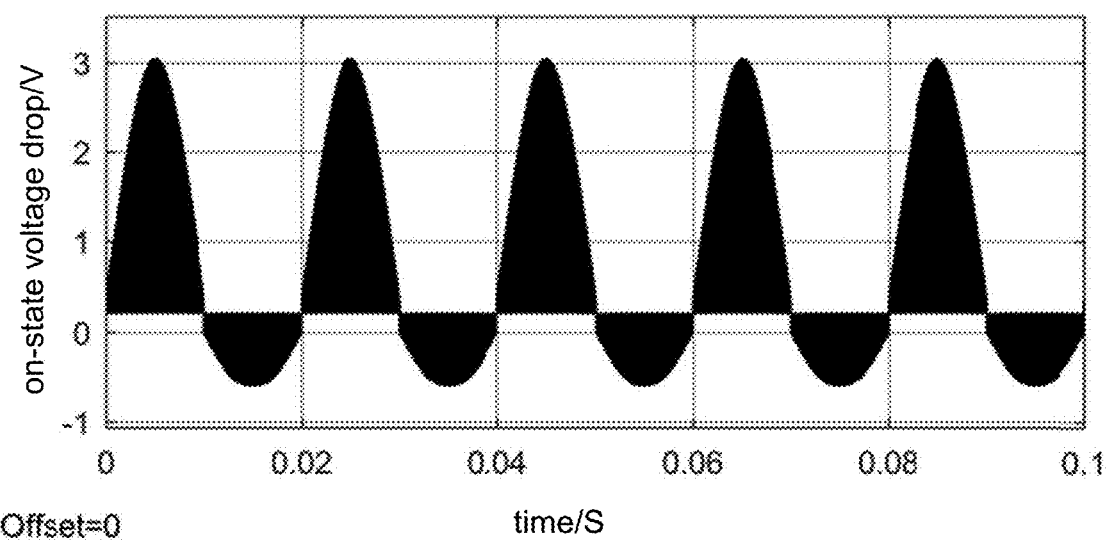
FIG. 5 illustrates waveforms of a collector-emitter on-state voltage drop Vce_on of a U-phase upper arm IGBT according to an embodiment of the disclosure.

As shown in FIG. 5, the monitoring waveform of the collector-emitter on-state voltage drop Vce_on of the U-phase upper arm IGBT during the operation of the photovoltaic inverter, the positive half cycle of the waveform is the change of the on-state voltage drop of the U-phase upper arm IGBT during the on-state period, and the negative half cycle of the waveform is the on-state voltage drop of the anti-parallel diode at both ends of the U-phase upper arm IGBT during the off-state period. Finally, it can be found that the measurement circuit successfully shield the high voltage across the collector and emitter of the IGBT during off-state period.

Figure 6:
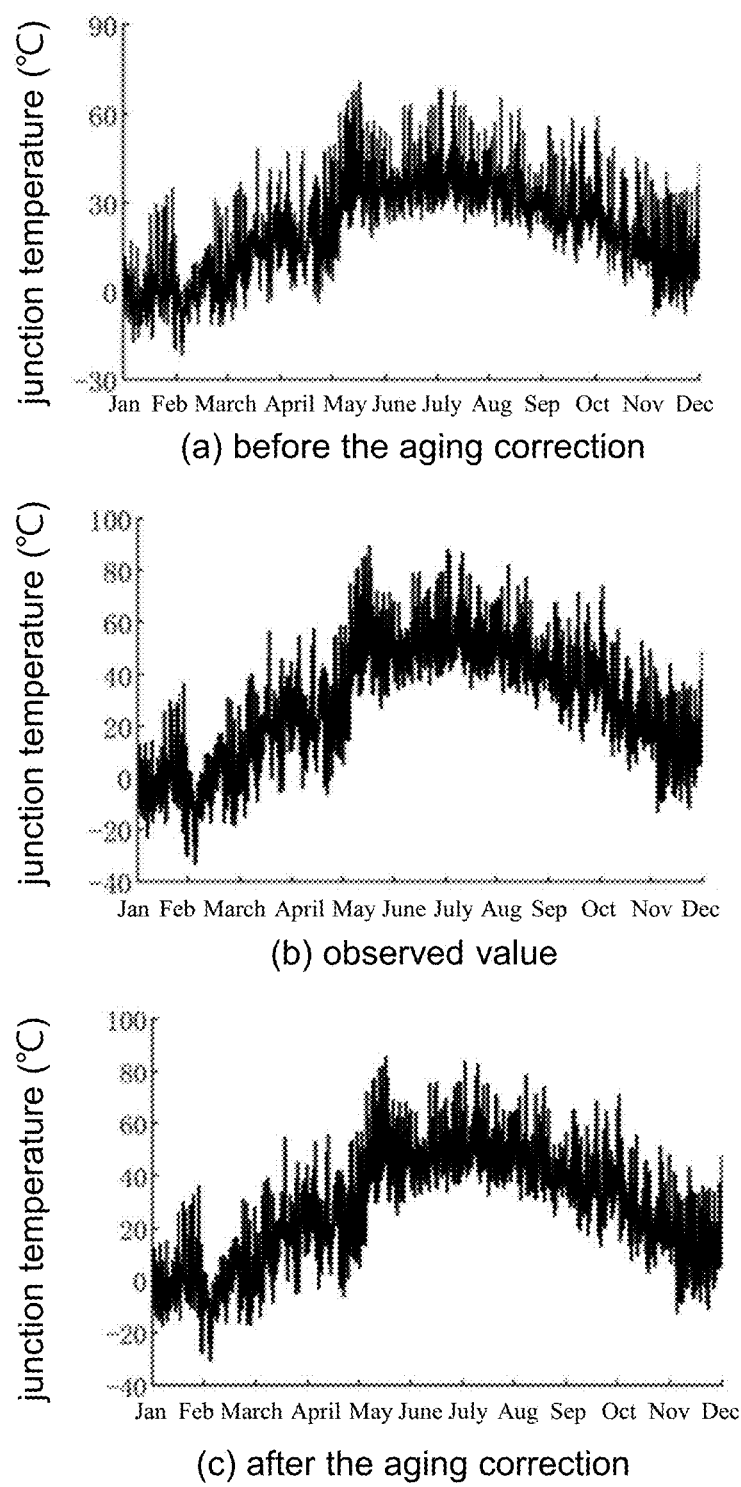
FIG. 6 illustrates a comparison between the junction temperatures of an IGBT module before and after aging correction according to an embodiment of the disclosure.

Moreover, the junction temperature is estimated based on the monitoring data of the photovoltaic power station within one year. In FIG. 6, the junction temperature fluctuation curve before the aging correction is compared with the junction temperature fluctuation curve after the aging correction. In FIG. 6, part (a) illustrates the junction temperature fluctuation curve before the aging correction, part (b) illustrates the actual observed junction temperature fluctuation curve, and part (c) illustrates the junction temperature fluctuation curve after the aging correction. It can be found that the junction temperature fluctuation curve of the IGBT module after the aging correction corresponds to the actual situation in a more appropriate manner.

In the embodiment of the disclosure, for the photovoltaic three-phase two-level inverter, the IGBT collector-emitter on-state voltage drop Vce_on sampling circuit is designed. With fewer circuit components and without additional driving signals, it is implemented that the high voltage across the collector-emitter of the IGBT is shielded when the IGBT is turned off, and the sampling accuracy of the on-state voltage drop is improved.

This application also provides a system for online correction of the junction temperatures of an insulated gate bipolar transistor (IGBT) module in a photovoltaic inverter considering the aging process. The system includes:

a model constructing module used to construct an electrothermal coupling model of an IGBT model based on the photovoltaic inverter topology, IGBT model, light radiation intensity, and ambient temperature;

a sampling module used to use the IGBT collector-emitter on-state voltage drop Vce_on as the aging parameter and design a voltage sampling circuit according to the working characteristics of the IGBT to collect the IGBT collector-emitter on-state voltage drop;

a test module used to construct an aging database for IGBT modules in different aging stages based on large current and small current injection methods, wherein the aging database includes a test current, an aging threshold, and a calibrated junction temperature value;

a correction module used to compare the junction temperature value output by the electrothermal coupling model with the calibrated junction temperature value and calibrate the aging process coefficient of the electrothermal coupling model correction formula; and an aging process monitoring module used to compare the IGBT aging monitoring value with the aging threshold to determine the aging process and select the corresponding aging process coefficient to ensure the accuracy of the junction temperature data.

In some alternative embodiments, the sampling module includes:

an upper arm sampling module used for the design of the upper arm IGBT collector-emitter on-state voltage drop measurement circuit of any one of the U, V, and W three-phase circuits: the measurement circuit includes a self-driving MOSFET, an external driving MOSFET, a current limiting circuit, and a ground terminal GND, wherein the driving signal of the external driving MOSFET is the driving signal of the lower arm IGBT, and the turn-on threshold of the self-driving MOSFET is a negative value; when the upper arm IGBT is turned on, the current does not flow through the sampling branch, meanwhile the driving voltage of the self-driving MOSFET is 0 greater than the turn-on threshold, and the voltage at the measurement port is voltage drop Vce_on during conduction of the IGBT collector-emitter when the upper arm IGBT is turned off, the current flows through the sampling branch, and the negative voltage drop generated across the current limiting resistor is less than the turn-on threshold of the self-driving MOSFET, so the self-driving MOSFET is turned off; the driving signal of the external driving MOSFET in the lower arm IGBT is turned on, the voltage at the measurement port is set to 0; through the working process, voltage drop Vce_on during conduction of the IGBT collector-emitter of the upper arm IGBT can be collected, and the high voltage across the collector-emitter can be shielded when the IGBT is turned off; and a lower arm sampling module used for the design of the lower arm IGBT collector-emitter on-state voltage drop measurement circuit of any one of the U, V, and W three-phase circuits: the measurement circuit includes a self-driving MOSFET, an external driving MOSFET, a current limiting circuit, a negative voltage port V−, and a ground terminal GND, wherein the driving signal of the external driving MOSFET is the driving signal of the upper arm IGBT, and the turn-on threshold of the self-driving MOSFET is a negative value; when the lower arm IGBT is turned on, the current does not flow through the sampling branch, meanwhile the driving voltage of the self-driving MOSFET is 0 greater than the turn-on threshold, and the voltage at the measurement port is voltage drop Vce_on during conduction of the IGBT collector-emitter; when the lower arm IGBT is turned off, the current flows through the sampling branch, and the negative voltage drop generated across the current limiting resistor is less than the turn-on threshold of the self-driving MOSFET, so the self-driving MOSFET is turned off, meanwhile the driving signal of the external driving MOSFET in the lower arm IGBT is turned on, and the voltage of the measurement port is set to the voltage value of the negative voltage port; through the working process, voltage drop Vce_on during conduction of the IGBT collector-emitter of the U-phase lower arm IGBT can be collected, and the high voltage across the collector-emitter can be shielded when the IGBT is turned off.

In some alternative embodiments, the test module is used to enable a healthy IGBT module in a photovoltaic inverter to work at a small current Imin (about 100 mA) and measure the corresponding relationship between the collector-emitter on-state voltage drop Vce_min and the junction temperature Tj, wherein when working at a small current, the collector-emitter on-state voltage drop of the IGBT module has a linear relationship with the junction temperature and is not affected by the aging process; simulate different aging stages by cutting the IGBT module bonding wire; and for IGBT modules in different aging stages, enable the IGBT modules to work at the large current Imax (IGBT rated current), and measure the current collector-emitter on-state voltage drop Vce_max as the threshold of the current aging stage, in the same switching signal cycle, inject a small current Imin (about 100 mA) to measure the collector-emitter on-state voltage drop Vce_min, and accordingly measure the junction temperature Tj as the calibrated junction temperature value in the current aging stage.

In some alternative implementations, the correction module is used to keep the test conditions of the operating parameters of the electrothermal coupling model consistent for each aging stage, calculate the difference ΔT between the output junction temperature value of the electrothermal coupling model and the calibrated junction temperature value, adjust the aging process coefficient β in the equivalent thermal network parameter correction formula of the electrothermal coupling model so that the difference ΔT is 0, and record the current aging correction coefficient β. In C=C₀(1+l·β^m), C represents the corrected equivalent thermal network parameters, C₀ is the original equivalent thermal network parameters, l is the aging characteristic value of the IGBT module, β is the aging process coefficient, and m is the accelerated aging factor.

For the specific implementation of each module, refer to the description of the method embodiment, which is not iterated herein.

The present application further provides a computer-readable storage medium on which a computer program is stored. When a program is executed by a processor, the method for online correction of junction temperatures of an IGBT module in a photovoltaic inverter considering the aging process in the method embodiment is implemented.

It should be pointed out that according to the needs of implementation, each step/component described in this application can be split into more steps/components, or two or more steps/components or partial operations of steps/components can be combined into new steps/components to achieve the purpose of the disclosure.

Those skilled in the art can easily tell that the above are only preferred embodiments of the disclosure and are not intended to limit the disclosure. Any modification, equivalent replacement and improvement, and the like made within the spirit and principle of the disclosure shall be included in the protection scope of the disclosure.

What is claimed is:

1. A method for online correction of junction temperatures of an insulated gate bipolar transistor (IGBT) in a photovoltaic inverter considering an aging process, comprising:
   (1) constructing an electrothermal coupling model of an IGBT model based on a photovoltaic inverter topology, the IGBT model, a light radiation intensity, and an ambient temperature;
   (2) using an IGBT collector-emitter on-state voltage drop Vce_on as an aging parameter and designing a voltage sampling circuit according to working characteristics of the IGBT to collect the IGBT collector-emitter on-state voltage drop;
   (3) constructing an aging database for IGBT modules in different aging stages based on large current and small current injection methods, wherein the aging database comprises a test current, an aging threshold, and a calibrated junction temperature value;
   (4) comparing a junction temperature value output by the electrothermal coupling model with the calibrated junction temperature value and calibrating an aging process coefficient of an electrothermal coupling model correction formula; and
   (5) comparing an IGBT aging monitoring value with the aging threshold to determine the aging process and selecting a corresponding aging process coefficient to ensure accuracy of junction temperature data.

2. The method according to claim 1, wherein step (2) comprises:
(2.1) designing an upper arm IGBT collector-emitter on-state voltage drop measurement circuit for any one of U, V, and W three-phase circuits, wherein the measurement circuit comprises a self-driving MOSFET, an external driving MOSFET, a current limiting circuit, and a ground terminal GND, wherein a driving signal of the external driving MOSFET is a driving signal of a lower arm IGBT, and a turn-on threshold of the self-driving MOSFET is a negative value; when an upper arm IGBT is turned on, a current does not flow through a sampling branch, meanwhile a driving voltage of the self-driving MOSFET is 0 greater than the turn-on threshold, and a voltage at a measurement port is voltage drop Vce_on during conduction of the IGBT collector-emitter; when the upper arm IGBT is turned off, the current flows through the sampling branch, and a negative voltage drop generated across a current limiting resistor is less than the turn-on threshold of the self-driving MOSFET, so the self-driving MOSFET is turned off, meanwhile the driving signal of the external driving MOSFET in the lower arm IGBT is turned on, the voltage at the measurement port is set to 0; through the working process, voltage drop Vce_on during conduction of the IGBT collector-emitter of the upper arm IGBT can be collected, and a high voltage across a collector-emitter can be shielded when the IGBT is turned off; and
(2.2) designing a lower arm IGBT collector-emitter on-state voltage drop measurement circuit for any one of the U, V, and W three-phase circuits, wherein the measurement circuit comprises a self-driving MOSFET, an external driving MOSFET, a current limiting circuit, a negative voltage port V−, and a ground terminal GND, wherein a driving signal of the external driving MOSFET is a driving signal of an upper arm IGBT, and a turn-on threshold of the self-driving MOSFET is a negative value; when a lower arm IGBT is turned on, a current does not flow through a sampling branch, meanwhile a driving voltage of the self-driving MOSFET is 0 greater than the turn-on threshold, and a voltage at a measurement port is voltage drop Vce_on during conduction of the IGBT collector-emitter; when the lower arm IGBT is turned off, the current flows through the sampling branch, and a negative voltage drop generated across a current limiting resistor is less than the turn-on threshold of the self-driving MOSFET, so the self-driving MOSFET is turned off, meanwhile the driving signal of the external driving MOSFET in the lower arm IGBT is turned on, and the voltage at the measurement port is set to a voltage value of the negative voltage port; through the working process, voltage drop Vce_on during conduction of the IGBT collector-emitter of an U-phase lower arm IGBT can be collected, and a high voltage across a collector-emitter can be shielded when the IGBT is turned off.

3. The method according to claim 2, wherein step (3) comprises:
(3.1) enabling a healthy IGBT module in the photovoltaic inverter to work at a small current Imin and measuring a corresponding relationship between a collector-emitter on-state voltage drop Vce_min and a junction temperature Tj, wherein when working at the small current, the collector-emitter on-state voltage drop of the healthy IGBT module has a linear relationship with the junction temperature and is not affected by the aging process;
(3.2) simulating different aging stages of an IGBT module by shearing bond lines of the IGBT module; and
(3.3) for IGBT modules in different aging stages, enabling the IGBT modules to work at a large current Imax and measuring a current collector-emitter on-state voltage drop Vce_max as a threshold value of a current aging stage, in a same switching signal cycle, injecting the small current Imin to measure the collector-emitter on-state voltage drop Vce_min, and accordingly measuring the junction temperature Tj as a calibrated junction temperature value of the current aging stage.

4. The method according to claim 3, wherein step (4) comprises:
(4.1) keeping test conditions of operating parameters of the electrothermal coupling model consistent for each aging stage;
(4.2) calculating a difference ΔT between an output junction temperature value of the electrothermal coupling model and the calibrated junction temperature value; and
(4.3) adjusting an aging process coefficient β in an equivalent thermal network parameter correction formula of the electrothermal coupling model so that the difference ΔT is 0, and recording a current aging correction coefficient β, wherein $C=C_0(1+l\cdot\beta^m)$, C represents corrected equivalent thermal network parameters, $C_0$ is original equivalent thermal network parameters, l is an aging characteristic value of the IGBT module, β is the aging process coefficient, and m is an accelerated aging factor.

5. A computer-readable storage medium having a computer program stored thereon, wherein the steps of the method of claim 4 are implemented when a computer program is executed by a processor.

6. A computer-readable storage medium having a computer program stored thereon, wherein the steps of the method of claim 3 are implemented when a computer program is executed by a processor.

7. A computer-readable storage medium having a computer program stored thereon, wherein the steps of the method of claim 2 are implemented when a computer program is executed by a processor.

8. The method according to claim 1, wherein step (3) comprises:
(5.1) enabling a healthy IGBT module in the photovoltaic inverter to work at a small current Imin and measuring a corresponding relationship between a collector-emitter on-state voltage drop Vce_min and a junction temperature Tj, wherein when working at the small current, the collector-emitter on-state voltage drop of the healthy IGBT module has a linear relationship with the junction temperature and is not affected by the aging process;
(5.2) simulating different aging stages of an IGBT module by shearing bond lines of the IGBT module; and
(5.3) for IGBT modules in different aging stages, enabling the IGBT modules to work at a large current Imax and measuring a current collector-emitter on-state voltage drop Vce_max as a threshold value of a current aging stage, in a same switching signal cycle, injecting the small current Imin to measure the collector-emitter on-state voltage drop Vce_min, and accordingly measuring the junction temperature Tj as a calibrated junction temperature value of the current aging stage.

9. The method according to claim 8, wherein step (4) comprises:
- (6.1) keeping test conditions of operating parameters of the electrothermal coupling model consistent for each aging stage;
- (6.2) calculating a difference $\Delta T$ between an output junction temperature value of the electrothermal coupling model and the calibrated junction temperature value; and
- (6.3) adjusting an aging process coefficient β in an equivalent thermal network parameter correction formula of the electrothermal coupling model so that the difference $\Delta T$ is 0, and recording a current aging correction coefficient β, wherein $C=C_0(1+l\cdot\beta^m)$, C represents corrected equivalent thermal network parameters, $C_0$ is original equivalent thermal network parameters, l is an aging characteristic value of the IGBT module, β is the aging process coefficient, and m is an accelerated aging factor.

10. A computer-readable storage medium having a computer program stored thereon, wherein the steps of the method of claim 9 are implemented when a computer program is executed by a processor.

11. A computer-readable storage medium having a computer program stored thereon, wherein the steps of the method of claim 8 are implemented when a computer program is executed by a processor.

12. A computer-readable storage medium having a computer program stored thereon, wherein the steps of the method of claim 1 are implemented when a computer program is executed by a processor.

13. A system for online correction of junction temperatures of an insulated gate bipolar transistor (IGBT) in a photovoltaic inverter considering an aging process, comprising:
- a model constructing module used to construct an electrothermal coupling model of an IGBT model based on a photovoltaic inverter topology, the IGBT model, a light radiation intensity, and an ambient temperature;
- a sampling module used to use an IGBT collector-emitter on-state voltage drop Vce_on as an aging parameter and design a voltage sampling circuit according to working characteristics of the IGBT to collect the IGBT collector-emitter on-state voltage drop;
- a test module used to construct an aging database for IGBT modules in different aging stages based on large current and small current injection methods, wherein the aging database comprises a test current, an aging threshold, and a calibrated junction temperature value;
- a correction module used to compare a junction temperature value output by the electrothermal coupling model with the calibrated junction temperature value and calibrate an aging process coefficient of an electrothermal coupling model correction formula; and
- an aging process monitoring module used to compare an IGBT aging monitoring value with the aging threshold to determine the aging process and select a corresponding aging process coefficient to ensure accuracy of junction temperature data.

14. The system according to claim 13, wherein the sampling module comprises:
- an upper arm sampling module used for a design of an upper arm IGBT collector-emitter on-state voltage drop measurement circuit of any one of U, V, and W three-phase circuits, wherein the measurement circuit comprises a self-driving MOSFET, an external driving MOSFET, a current limiting circuit, and a ground terminal GND, wherein a driving signal of the external driving MOSFET is a driving signal of an lower arm IGBT, and a turn-on threshold of the self-driving MOSFET is a negative value; when an upper arm IGBT is turned on, a current does not flow through a sampling branch, meanwhile a driving voltage of the self-driving MOSFET is 0 greater than the turn-on threshold, and a voltage at a measurement port is voltage drop Vce_on during conduction of the IGBT collector-emitter; when the upper arm IGBT is turned off, the current flows through the sampling branch, and a negative voltage drop generated across a current limiting resistor is less than the turn-on threshold of the self-driving MOSFET, so the self-driving MOSFET is turned off, meanwhile the driving signal of the external driving MOSFET in the lower arm IGBT is turned on, the voltage at the measurement port is set to 0; through the working process, voltage drop Vce_on during conduction of the IGBT collector-emitter of the upper arm IGBT can be collected, and a high voltage across a collector-emitter can be shielded when the IGBT is turned off; and
- a lower arm sampling module used for a design of a lower arm IGBT collector-emitter on-state voltage drop measurement circuit of any one of the U, V, and W three-phase circuits: the measurement circuit comprises a self-driving MOSFET, an external driving MOSFET, a current limiting circuit, a negative voltage port V−, and a ground terminal GND, wherein a driving signal of the external driving MOSFET is a driving signal of an upper arm IGBT, and a turn-on threshold of the self-driving MOSFET is a negative value; when a lower arm IGBT is turned on, a current does not flow through a sampling branch, meanwhile a driving voltage of the self-driving MOSFET is 0 greater than the turn-on threshold, and a voltage at a measurement port is voltage drop Vce_on during conduction of the IGBT collector-emitter; when the lower arm IGBT is turned off, the current flows through the sampling branch, and a negative voltage drop generated across a current limiting resistor is less than the turn-on threshold of the self-driving MOSFET, so the self-driving MOSFET is turned off, meanwhile the driving signal of the external driving MOSFET in the lower arm IGBT is turned on, and the voltage of the measurement port is set to a voltage value of the negative voltage port; through the working process, voltage drop Vce_on during conduction of the IGBT collector-emitter of an U-phase lower arm IGBT can be collected, and a high voltage across a collector-emitter can be shielded when the IGBT is turned off.

15. The system according to claim 14, wherein the test module is used to enable a healthy IGBT module in the photovoltaic inverter to work at a small current Imin and measure a corresponding relationship between a collector-emitter on-state voltage drop Vce_min and a junction temperature Tj, wherein when working at the small current, the collector-emitter on-state voltage drop of the healthy IGBT module has a linear relationship with the junction temperature and is not affected by the aging process; simulate different aging stages of an IGBT module by shearing bond lines of the IGBT module; and for the IGBT modules in different aging stages, enable the IGBT modules to work at a large current Imax, and measure a current collector-emitter on-state voltage drop Vce_max as a threshold value of a current aging stage, in a same switching signal cycle, inject the small current Imin to measure the collector-emitter on-state voltage drop Vce_min, and accordingly measure the junction temperature Tj as a calibrated junction temperature value in the current aging stage.

16. The system according to claim 15, wherein the correction module is used to keep test conditions of operating parameters of the electrothermal coupling model consistent for each aging stage; calculate a difference ΔT between an output junction temperature value of the electrothermal coupling model and the calibrated junction temperature value; and adjust an aging process coefficient β in an equivalent thermal network parameter correction formula of the electrothermal coupling model so that the difference ΔT is 0, and record a current aging correction coefficient β, wherein $C=C_0(1+l\cdot\beta^m)$, C represents corrected equivalent thermal network parameters, $C_0$ is original equivalent thermal network parameters, l is an aging characteristic value of the IGBT module, β is the aging process coefficient, and m is an accelerated aging factor.

17. The system according to claim 13, wherein the test module is used to enable a healthy IGBT module in the photovoltaic inverter to work at a small current Imin and measure a corresponding relationship between a collector-emitter on-state voltage drop Vce_min and a junction temperature Tj, wherein when working at the small current, the collector-emitter on-state voltage drop of the healthy IGBT module has a linear relationship with the junction temperature and is not affected by the aging process; simulate different aging stages of an IGBT module by shearing bond lines of the IGBT module; and for the IGBT modules in different aging stages, enable the IGBT modules to work at a large current Imax, and measure a current collector-emitter on-state voltage drop Vce_max as a threshold value of a current aging stage, in a same switching signal cycle, inject the small current Imin to measure the collector-emitter on-state voltage drop Vce_min, and accordingly measure the junction temperature Tj as a calibrated junction temperature value in the current aging stage.

18. The system according to claim 17, wherein the correction module is used to keep test conditions of operating parameters of the electrothermal coupling model consistent for each aging stage; calculate a difference ΔT between an output junction temperature value of the electrothermal coupling model and the calibrated junction temperature value; and adjust an aging process coefficient β in an equivalent thermal network parameter correction formula of the electrothermal coupling model so that the difference ΔT is 0, and record a current aging correction coefficient β, wherein $C=C_0(1+l\cdot\beta^m)$, C represents corrected equivalent thermal network parameters, $C_0$ is original equivalent thermal network parameters, l is an aging characteristic value of the IGBT module, β is the aging process coefficient, and m is an accelerated aging factor.

* * * * *